(12) United States Patent
Chiu et al.

(10) Patent No.: US 7,835,840 B2
(45) Date of Patent: Nov. 16, 2010

(54) TRANSMISSION NEUTRAL STATE MANAGEMENT IN VEHICULAR SAFETY AND CONVENIENCE SYSTEMS

(75) Inventors: Wanli Chiu, Troy, MI (US); Osman D. Altan, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 820 days.

(21) Appl. No.: 11/680,823

(22) Filed: Mar. 1, 2007

(65) Prior Publication Data
US 2007/0219695 A1    Sep. 20, 2007

Related U.S. Application Data

(60) Provisional application No. 60/778,669, filed on Mar. 3, 2006, provisional application No. 60/787,624, filed on Mar. 30, 2006.

(51) Int. Cl.
*F16H 63/36* (2006.01)
*G06F 19/00* (2006.01)
(52) U.S. Cl. .................. 701/51; 701/64; 74/474.23
(58) Field of Classification Search .......... 701/1, 701/51, 64, 67
See application file for complete search history.

(56) References Cited

U.S. PATENT DOCUMENTS

| 4,884,669 | A | | 12/1989 | Ehrlinger |
| 5,272,630 | A | * | 12/1993 | Brown et al. .................. 701/68 |
| 5,887,483 | A | | 3/1999 | Ohashi et al. |
| 6,017,102 | A | | 1/2000 | Aga |
| 6,151,543 | A | * | 11/2000 | McKee et al. ................. 701/55 |
| 6,625,534 | B2 | * | 9/2003 | Suzuki et al. ................. 701/62 |
| 6,842,684 | B1 | | 1/2005 | Kade et al. |
| 7,451,029 | B2 | * | 11/2008 | McLaren et al. .............. 701/50 |
| 2003/0000329 | A1 | * | 1/2003 | Okubo et al. ............ 74/473.23 |
| 2005/0246081 | A1 | | 11/2005 | Bonnet et al. |
| 2005/0258977 | A1 | | 11/2005 | Kiefer et al. |

FOREIGN PATENT DOCUMENTS

| EP | 1108605 A1 | 6/2001 |
| EP | 1108605 A1 | 6/2001 |

\* cited by examiner

*Primary Examiner*—Tan Q Nguyen (57) ABSTRACT

Transmission shift history is tracked using the current transmission state and the immediately preceding transmission state and the vehicle speed during a cycle of Neutral transmission state. Vehicular safety and convenience applications are extended to Neutral states of the transmission.

9 Claims, 7 Drawing Sheets

TRANSMISSION NEUTRAL STATE MANAGEMENT IN VEHICULAR SAFETY AND CONVENIENCE SYSTEMS

CROSS REFERENCE TO RELATED APPLICATIONS

This application claims priority to U.S. provisional patent application Ser. No. 60/778,669 filed on Mar. 3, 2006 which is hereby incorporated herein by reference and to U.S. provisional patent application Ser. No. 60/787,624 filed on Mar. 30, 2006 which is hereby incorporated herein by reference.

TECHNICAL FIELD

The present invention is related to safety and convenience applications for road vehicles during Neutral transmission states. More particularly, the invention relates to determination of vehicle travel direction during transmission Neutral transmission states.

BACKGROUND OF THE INVENTION

Various vehicular safety and convenience applications involve sensing or having knowledge of items or objects of interest in or around the vehicle and using such knowledge to take certain actions categorically information, warning, or control related. Such applications may, for example, provide driving environment information and warning to the driver thereby enhancing driver situational awareness and improving opportunity for driver adaptation and intervention in the control of the vehicle (e.g. through braking, throttle and steering), or provide active, semi-active, assistive or adaptive control of vehicle systems based at least in part upon the knowledge of the items or objects of interest.

Depending on the safety and convenience applications, the items or objects of interests may include, for example, other vehicles, obstacles that may pose a collision threat to a moving vehicle, pedestrians, animals, driver's cognizance and state of alertness, location and location related information (such as speed limits), road lanes and other road features, a vehicle's instantaneous stability, traffic signs and signals, ambient lighting and weather conditions, etc. Items or objects of interest knowledge may come from a variety of sensing systems including radar, laser, lidar, ultrasonic, visual or thermal imaging systems, and object recognition based on such imaging systems.

Depending on the safety and convenience applications, the actions taken may include, for example, presenting information and alerts to the driver (e.g. visual, audio or haptic operator warnings), or controlling vehicle systems (e.g. brakes).

Many safety and convenience applications, in information, warning, and control categories, are directional in nature. Direction of the vehicle movement is often used in determining whether application functions should be enabled or disabled by control software. The direction of vehicle movement can be determined with sensors designed for that purpose (such as quadrature phase wheel speed sensors and associated electronic circuitry); however, this approach comes with the increased cost of the sensors. An alternative approach is to use the transmission state to infer the direction of the vehicle movement. In other words, assume forward movement when a forward gear is selected and reverse movement when a reverse gear is selected. While this avoids the cost associated with sensors designed to determine the direction of the vehicle movement, this approach faces challenges when the transmission is in a Neutral state. While functionality may simply be disabled for a transmission Neutral state, the functionalities of the application and the benefits thereof will not be available when the transmission is shifted to Neutral, whether volitionally or not. But there are situations where it is desirable to have the application functionalities and benefits while the transmission is in the Neutral state. Such situations may be more common in vehicles with a manual transmission wherein clutch disengagement and gear transitions are Neutral states. Even in vehicles with an automatic transmission, however, a Neutral state may be purposefully invoked by placing the gear selector into a Neutral position or inadvertently invoked by incorrectly or accidental positioning of the gear selector.

Therefore, it is desirable to have a way to manage a transmission Neutral state such that, for example, vehicular safety and convenience application functionalities can be selectively extended thereto without incurring cost associated with sensors designed to determine the direction of the vehicle movement.

SUMMARY OF THE INVENTION

The present invention tracks the transmission shift history using the current transmission state and the immediately preceding transmission state and the vehicle speed during a cycle of transmission Neutral state. The invention extends functionality of various vehicular safety and convenience applications to Neutral states of the transmission.

A method for determining direction of travel of a motor vehicle including a transmission having selectable gear states includes monitoring the transmission for a current gear state and an immediately preceding gear state. Vehicle speed is also monitored. Direction of travel is determined when the current gear state is a forward or reverse gear state. Direction of travel is also determined when the current gear state is a Neutral gear state, the immediately preceding gear state is a forward or reverse gear state, and vehicle speed during the current gear state remains above a predetermined threshold. An indeterminate direction of travel is determined when the current gear state is Neutral and vehicle speed at any time during the current gear state is below a predetermined threshold. More particularly, a forward direction of travel is determined when the current gear state is a forward gear state or when the current gear state is a Neutral gear state, the immediately preceding gear state is a forward gear state, and vehicle speed during the current Neutral state remains above a predetermined threshold. And similarly, reverse direction of travel is determined when the current gear state is a reverse gear state or the current gear state is a Neutral gear state, the immediately preceding gear state is a reverse gear state, and vehicle speed at all times during the current Neutral state is above a predetermined threshold.

DESCRIPTION OF THE PREFERRED EMBODIMENT

Figure 1:
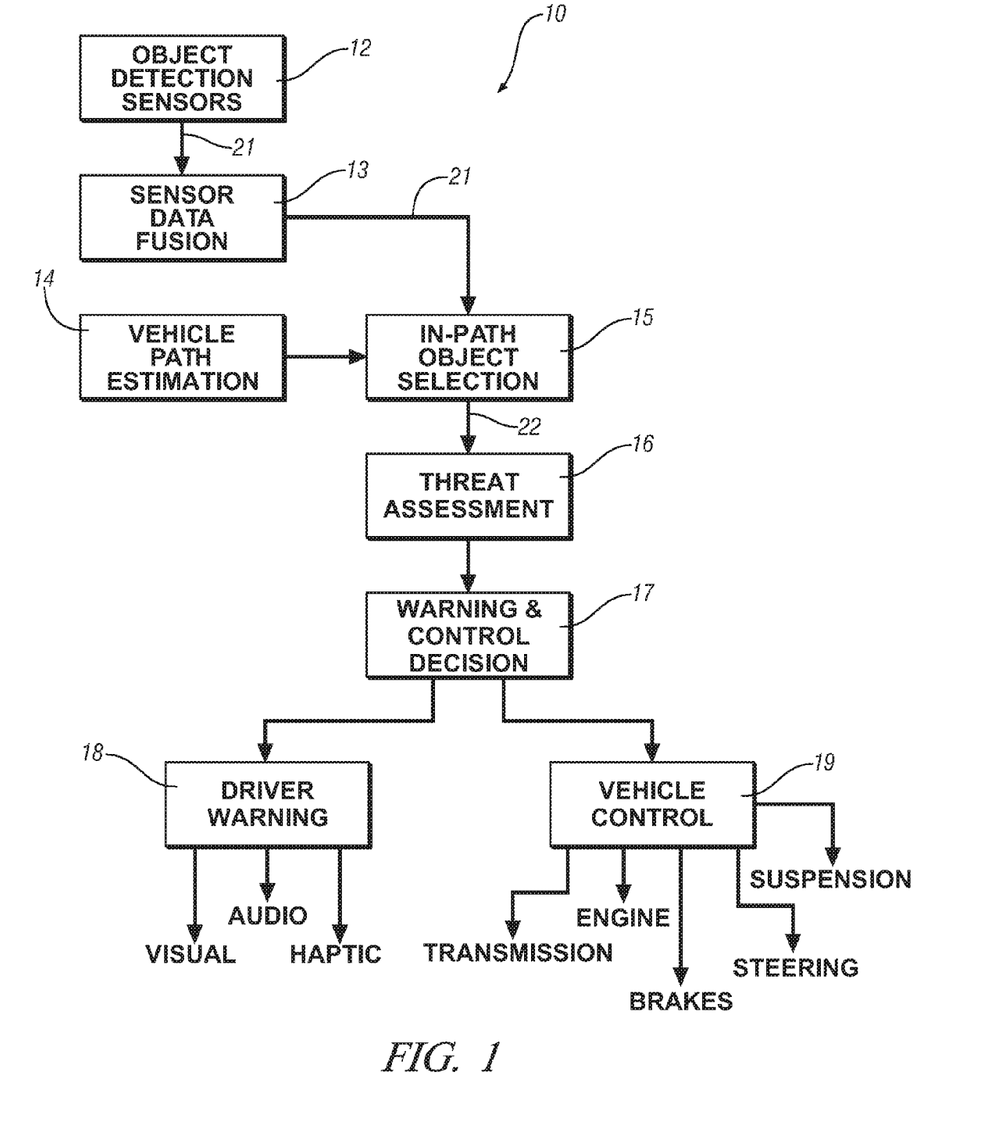
FIG. 1 is a schematic block diagram including various exemplary functions related to vehicular safety and convenience applications.

With reference first to FIG. 1, a block diagram 10 including various exemplary functions related to vehicular safety and convenience applications is illustrated. The functions represented by the various portions of the block diagram 10 may be carried out in one or more general purpose computer based controllers. Also, as will become more apparent from the description herein below, the tasks carried out in the instruction sets associated with each of the functional blocks may be shared differently among various controllers, it not being particularly critical to the present invention the precise controller architecture nor resident controller of particular instruction sets.

In accordance with an exemplary embodiment of the invention, object sensing (12) associated with the vehicle may include such non-exhaustive examples as radar, laser, lidar, ultrasonic, visual or thermal imaging systems, and object recognition based on such imaging systems. Object sensing (12) may also include multiple, redundant sensor data as well as sensor filtering and pre-processing for provision of derived sensor data such as object range and range rate data in addition to mere object presence. Object sensor data (21) may be fused (13) using well known techniques. Object sensors are arranged strategically around the vehicle in accordance with the intended functionality and field of view desired. For example, forward looking sensors and sensor arrays may be integrated in to the front portion of a vehicle (e.g. bumper cover, fascia, behind windshield, side mirrors, headlights, fog lights). Similarly, rearward looking sensors may be integrated into rear portions of the vehicle (e.g. bumper cover, decklid, brake lights, reverse gear lights).

Vehicle path is estimated (14) based on a plurality of input data which may include vehicle speed, wheel speed, steering wheel position or angle, steered wheel position or angle, yaw rate, lateral acceleration, GPS/map database, and transmission gear state as determined by appropriate transmission gear state inputs such as, for example automatic and manual transmission gear selector lever position switch inputs and manual clutch engagement switches as well known to those skilled in the art.

Vehicle path estimation data (20) and object sensor data (21) are used in in-path object detection (15) wherein only objects which are deemed to be in the estimated vehicle path are further processed. In-path objects (22) are used in a threat assessment (16) to determine needed actions. Threat assessment (16) determines the level of threat and if there is a likelihood of collision based on parameters such as time-to-collision, vehicle braking and deceleration capability, exterior conditions such as wet surface, slippery surface, etc. Also, threat assessment computes parameters such as time headway which indicates how close the host vehicle is to the lead vehicle based on speed and range between vehicles. Driver warning and control (17) use the threat level to determine when to alert the driver (18) with visual, audio, and haptic warnings as to a potential collision so that the driver can execute proper actions of braking, steering, etc. If the driver does not heed the alerts, then vehicle controls (19) determine and apply proper amount of braking with engine torque reduction and/or steering.

Driver warnings (18) based on the output from warning and control decisions (17) are then implemented as appropriate. Such warnings may take the form of visual, audio or haptic alerts. The vehicle operator may be warned or apprised of object presence and orientation with respect to the vehicle, for example, via the vehicle sound system e.g. (voice synthesized messages, chimes, tones), visual displays (e.g. head up displays or instrument panel displays) or haptic means (e.g. vibratory seats) thereby enhancing collision avoidance through improved situational awareness. Active, semi-active, assistive or adaptive vehicle controls (19) may also be implemented based on the output from warning and control decisions (17). For example, active braking may be employed where it is determined that an in-path object is a likely collision target without braking intervention. Likewise, other vehicle systems may be controlled including suspension, transmission, engine, and steering. It is to be understood that the various driver warnings (18) and vehicle controls (19) shown with particularity in FIG. 1 are merely exemplary and not limiting. Other exemplary and non-limiting vehicle controls may include brake systems, engine systems, transmission systems, suspension systems including damping and torsion, front and rear steering systems, exterior body systems, and interior occupant protection systems. More particularly, actions taken may include, for example, curve speed advisor, curve speed control, lane change warning and assist, lane departure warning, lane keeping, lane centering, exterior lighting recommendation and control including directional control, potential ice warning, tire pressure notification, traffic sign recognition, speed limit advisor, speed limit follower, adaptive cruise control, automatic parking and park assist, forward and rear collision alert, blind zone alert, seatbelt pre-tensioning, seat position adjustment, head restraint adjustment, brake booster pre-fill, active braking, driver cognizance and assistance, terrain-based powertrain management, electronic stability control, rollover protection, pre-impact hood lifter and bumper extension, exterior rear-view mirror tilting and retraction, intelligent airbag deployment, extendable knee bolster, window and sunroof closing and other impact preparation actions.

In accordance with more detailed embodiments of the present invention, and with further reference to FIGS. 2-7, enablement of directionally dependent vehicular safety and convenience applications during Neutral states of automatic and manual transmissions is set forth. Neutral state management is described with particular reference to an automatic braking and driver alert applications though it is to be understood that such applications are merely intended to be taken by way of exemplary embodiments of the invention and in no way to be interpreted as limiting the application of the invention to other applications.

For example, a vehicle is stopped on an inclined surface with the transmission in Neutral. Operator release of the brake pedal would result in vehicle roll back or roll forward. Automatic braking or driver warning is desirable to avoid collision with objects in the vehicle's travel path. Also, while a vehicle is in motion, its transmission may be shifted to Neutral—whether intentionally or unintentionally. The vehicle will continue to move. Automatic braking or driver warning is desirable to avoid collision with objects in the vehicle's travel path.

As recognized herein above, the direction of vehicle movement cannot be determined with simple wheel or transmission output speed sensing when the transmission is in Neutral. In accordance with the present invention, however, functionality of an automatic braking system and/or collision warning system is successfully extended to Neutral state scenarios. The invention is applied to vehicles with automatic braking capability implemented in a forward, reverse or both directions (e.g. park assist, adaptive cruise control, etc.). The invention is also applied to collision warning systems (e.g. blind zone alerts, forward collision warning, etc.) in contrast to automatic braking systems. Further, the invention is applied to automatic and manual transmission configurations. Six implementations are described in further detail herein below in conjunction with FIGS. 2-7. In a first automatic transmission configured vehicle implementation corresponding to FIG. 2, an automatic braking system has both forward braking and reverse braking capabilities. In a second automatic transmission configured vehicle implementation, corresponding to FIG. 3, an automatic braking system has reverse braking capabilities only. And, in a third automatic transmission configured vehicle implementation, corresponding to FIG. 4, an automatic braking system has forward braking capabilities only. In a first manual transmission configured vehicle implementation corresponding to FIG. 5, an automatic braking system has both forward braking and reverse braking capabilities. In a second manual transmission configured vehicle implementation, corresponding to FIG. 6, an automatic braking system has reverse braking capabilities only. And, in a third manual transmission configured vehicle implementation, corresponding to FIG. 7, an automatic braking system has forward braking capabilities only.

The present invention with respect to both automatic and manual transmission configurations tracks transmission shift history with a rolling memory of the current transmission state and the previous transmission state. If the transmission state is Neutral, it also monitors whether the vehicle speed has been zero during the same cycle of the transmission Neutral state. Based the current and the previous transmission states and the vehicle speed information, a determination is made whether forward or reverse applications should be enabled (e.g. in the present exemplary embodiments, the forward braking/warnings or reverse braking/warnings). If the transmission state is not Neutral, applications consistent with the current transmission state are enabled (i.e. directionally dependent automatic braking/warning capability). If the transmission state is Neutral and the vehicle speed is zero or the vehicle speed has been zero in the same cycle of transmission Neutral state, both forward and reverse applications are enabled (i.e. bi-directional automatic braking/warnings). This provides automatic braking security, for example, to address a stopped vehicle roll back or roll forward situation. If the transmission state is Neutral and the vehicle speed has not been zero in the same cycle of transmission Neutral state, applications consistent with the previous transmission state is enabled (i.e. directionally dependent automatic braking/warning capability). This provides automatic braking security, for example, to address a shift to Neutral during vehicle motion situation.

Figure 2:
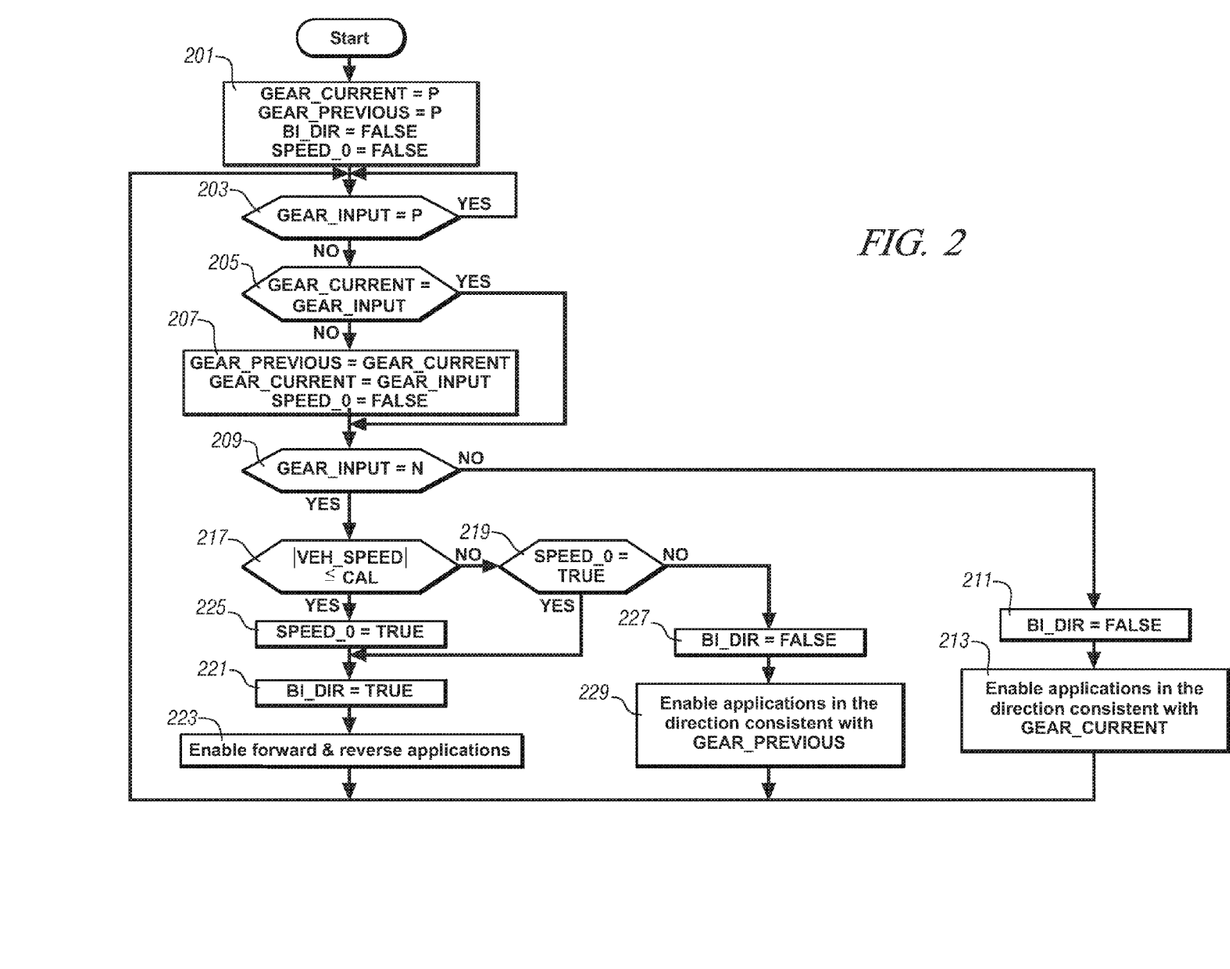
FIG. 2 is a block diagram illustrating exemplary tasks embodied in instruction sets of computer based controls for enabling bi-directional safety and convenience applications in a vehicle configured with an automatic transmission.

The block diagram of FIG. 2 illustrating exemplary tasks embodied in instruction sets of computer based controls for enabling bi-directional applications (e.g. in the present exemplary embodiments, forward and reverse braking/warnings) in a vehicle configured with an automatic transmission is described in further detail herein below. Certain exemplary parameters and flags are defined as follows:

GEAR_CURRENT is the current transmission state (e.g. P, R, N, OD, D, 3, 2, 1 for an exemplary four-speed automatic transmission);

GEAR_PREVIOUS is the previous transmission state, i.e. the transmission state before the last transmission shift (e.g. P, R, N, OD, D, 3, 2, 1 for an exemplary four-speed automatic transmission);

BI_DIR is TRUE if both forward and reverse applications need to be enabled; otherwise, BI_DIR is FALSE;

SPEED_0 is TRUE if vehicle speed has ever been zero during the current cycle of transmission Neutral state; otherwise, SPEED_0 is FALSE;

GEAR_INPUT is the transmission gear input to the system (e.g. P, R, N, OD, D, 3, 2, 1 for an exemplary four-speed automatic transmission);

VEH_SPEED is the vehicle speed.

Some initial conditions are assumed as follows:

GEAR_CURRENT=P (Park);

GEAR_PREVIOUS P;

BI_DIR=FALSE;

SPEED_0=FALSE.

These conditions correspond to a new vehicle ignition cycle initialization (201). So long as the vehicle transmission remains in Park, no further action is taken (203). A shift out of Park, or any time the transmission is not in Park, a check is made at (205) to determine whether a transmission shift between gears has occurred. Transmission shifts are tracked with rolling memory as follows. When there is a transmission shift, the new GEAR_INPUT will be different from GEAR_CURRENT and block (205) will pass control to block (207). Otherwise, block (205) will bypass block (207) and execute block (209). At block (207), GEAR_PREVIOUS is then set to GEAR_CURRENT, GEAR_CURRENT is set to GEAR_INPUT and SPEED_0 is set to FALSE.

Vehicle direction of travel is determined and applications are enabled in accordance with the present invention as follows. If GEAR_INPUT is not N (Neutral) as determined at block (209), then direction of travel is determined to correspond to the current gear state and applications only in the direction consistent with GEAR_CURRENT are enabled by setting BI_DIR to FALSE (211) and enabling applications in the direction consistent with the current transmission state GEAR_CURRENT (213). If, however, GEAR_INPUT is N (Neutral), then direction of travel and application enablement determinations are made in accordance with temporal vehicle speed and transmission shift history considerations (215). If GEAR_CURRENT=N (Neutral) (209) and the absolute value of vehicle speed is less than or equal to a calibration, |VEH_SPEED|≦CAL (217), or vehicle speed has been less than or equal to the calibration during the current transmission Neutral state, SPEED_0=TRUE (219), then direction of travel is indeterminate. In such a case, both the forward and reverse applications are enabled by setting BI_DIR to TRUE (221) and enabling applications in both directions (223). CAL represents a calibrated value indicative of a substantially null or zero vehicle speed. Where absolute value of vehicle speed is less than or equal to the calibration, |VEH_SPEED|≦CAL (217), then SPEED_0 is set to TRUE (225), thus indicating that the current transmission Neutral state has experienced a substantially zero vehicle speed. These situations (i.e. current zero vehicle speed or vehicle speed having been zero during the current transmission Neutral state) correspond to bi-directional application enablement, for example, to address a stopped vehicle roll back or roll forward on grade. If, however, GEAR_CURRENT=N (Neutral) and the absolute value of vehicle speed is not and has not been less than or equal to the calibration during the current transmission Neutral state, as determined by negative responses at blocks (217) and (219), then direction of travel is determined to correspond to the immediately preceding gear state and applications only in the direction consistent with GEAR_PREVIOUS are enabled by setting BI_DIR to FALSE (227) and enabling applications in the direction consistent with the previous transmission state GEAR_PREVIOUS (229). This situation provides application enablement, for example, to address a shift to neutral during vehicle motion. In all three cases above, the exemplary application enabled may include an operator warning that braking is prudent or a vehicle control of automatic braking.

Figure 3:
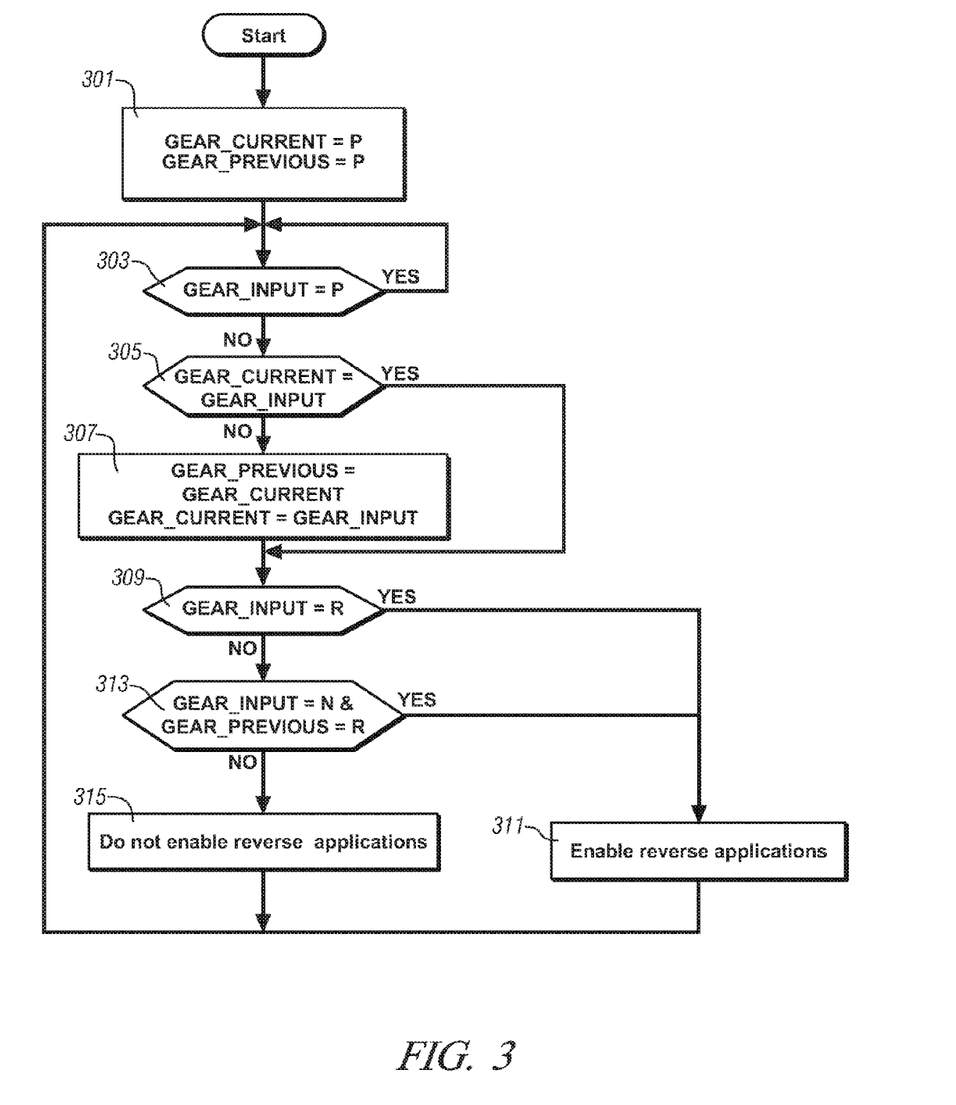
FIG. 3 is a block diagram illustrating exemplary tasks embodied in instruction sets of computer based controls for enabling only reverse directional safety and convenience applications in a vehicle configured with an automatic transmission.

The block diagram of FIG. 3 illustrating exemplary tasks embodied in instruction sets of computer based controls for enabling only reverse directional applications (e.g. in the present exemplary embodiments, reverse braking/warnings) in a vehicle configured with an automatic transmission is described in further detail herein below. In this case, there is no need for parameters BI_DIR, SPEED_0, and VEH_SPEED. The other parameters, flags and initial conditions remain as defined herein above with respect to the bi-directional implementation.

Some initial conditions are assumed as follows:
GEAR_CURRENT=P (Park);
GEAR_PREVIOUS=P.

These conditions correspond to a new vehicle ignition cycle initialization (301). So long as the vehicle transmission remains in Park, no further action is taken (303). A shift out of Park, or any time the transmission is not in Park, a check is made at (305) to determine whether a transmission shift between gears has occurred. Transmission shifts are tracked with rolling memory as follows. When there is a transmission shift, the new GEAR_INPUT will be different from GEAR_CURRENT and block (305) will pass control to block (307). Otherwise, block (305) will bypass block (307) and execute block (309). At block (307), GEAR_PREVIOUS is then set to GEAR_CURRENT and GEAR_CURRENT is set to GEAR_INPUT.

Vehicle direction of travel is determined and applications are enabled in accordance with the present invention as follows. If the transmission state GEAR_CURRENT=R (reverse) as determined at block (309), then direction of travel is determined to be reverse and reverse applications are enabled (311). If the transmission state is anything but reverse, i.e. block (309) being answered negatively, then direction of travel and application enablement determinations are made in accordance with temporal transmission shift history considerations (313). If the transmission is in a forward gear or the transmission was shifted to Neutral from a forward gear, then direction of travel is determined to be forward. In such a case, block (313) is answered negatively and control passes to block (315) whereat reverse applications are not enabled. Otherwise, the transmission was shifted to Neutral from reverse and direction of travel is determined to be reverse. In such a case, block (313) is answered affirmatively and control passes to block (311) whereat reverse applications are enabled. In the reverse cases above, the exemplary application enabled may include an operator warning that braking is prudent or a vehicle control of automatic braking.

Figure 4:
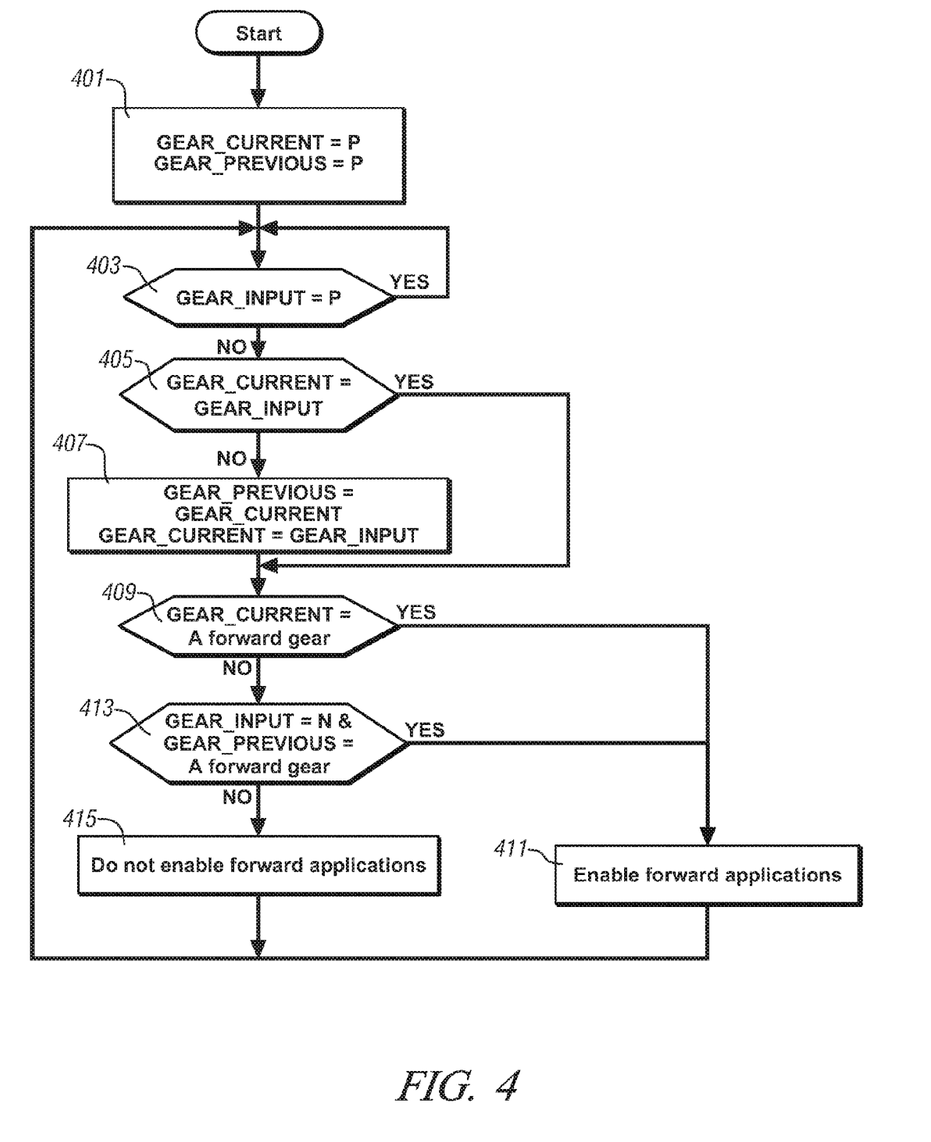
FIG. 4 is a block diagram illustrating exemplary tasks embodied in instruction sets of computer based controls for enabling only forward directional safety and convenience applications in a vehicle configured with an automatic transmission.

The block diagram of FIG. 4 illustrating exemplary tasks embodied in instruction sets of computer based controls for effecting only forward directional applications (e.g. in the present exemplary embodiments, forward braking/warnings) in a vehicle configured with an automatic transmission is described in further detail herein below. In this case, as in the case of only reverse directional applications, there is no need for parameters BI_DIR, SPEED_0, and VEH_SPEED. The other parameters and initial conditions remain as defined herein above with respect to the bi-directional implementation.

Some initial conditions are assumed as follows:
GEAR_CURRENT P (Park);
GEAR_PREVIOUS=P.

These conditions correspond to a new vehicle ignition cycle initialization (401). So long as the vehicle transmission remains in Park, no further action is taken (403). A shift out of Park, or any time the transmission is not in Park, a check is made at (405) to determine whether a transmission shift between gears has occurred. Transmission shifts are tracked with rolling memory as follows. When there is a transmission shift, the new GEAR_INPUT will be different from GEAR_CURRENT and block (405) will pass control to block (407). Otherwise, block (405) will bypass block (407) and execute block (409). At block (407), GEAR_PREVIOUS is then set to GEAR_CURRENT and GEAR_CURRENT is set to GEAR_INPUT.

Vehicle direction of travel is determined and applications enabled in accordance with the present invention as follows. If the transmission state GEAR_CURRENT=a forward gear as determined at block (409), then direction of travel is determined to be forward and forward applications are enabled (411). If the transmission state is anything but a forward gear, i.e. block (409) being answered negatively, then direction of travel and application enablement determinations are made in accordance with temporal transmission shift history considerations (413). If the transmission is in reverse or the transmission was shifted to Neutral from reverse, then direction of travel is determined to be reverse. In such a case, block (413) is answered negatively and control passes to block (415) whereat forward applications are not enabled. Otherwise, the transmission was shifted to Neutral from a forward gear and direction of travel is determined to be forward. In such a case, block (413) is answered affirmatively and control passes to block (411) whereat forward applications are enabled. In the forward cases above, the exemplary application enabled may include an operator warning that braking is prudent or a vehicle control of automatic braking.

Figure 5:
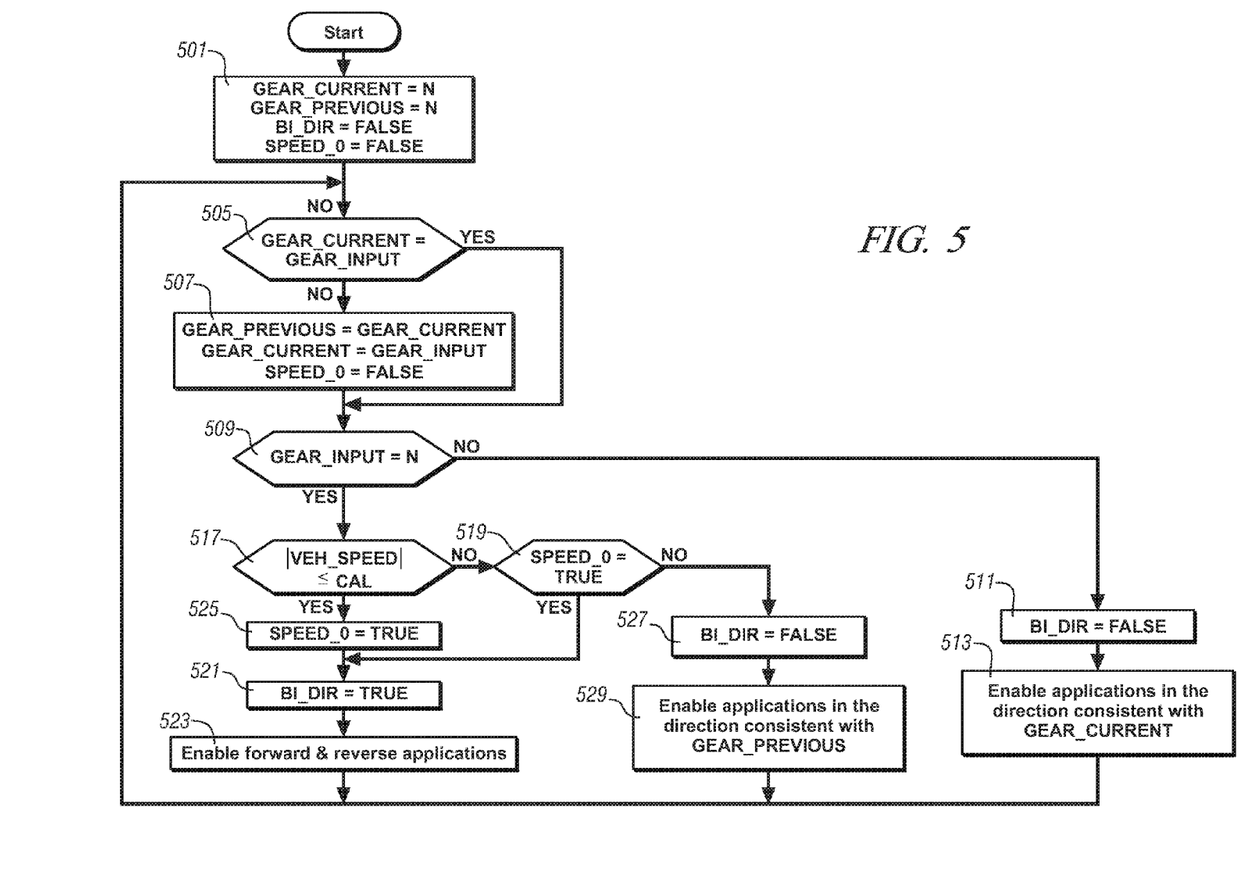
FIG. 5 is a block diagram illustrating exemplary tasks embodied in instruction sets of computer based controls for enabling bi-directional safety and convenience applications in a vehicle configured with a manual transmission.

The block diagram of FIG. 5 illustrating exemplary tasks embodied in instruction sets of computer based controls for effecting bi-directional applications (e.g. in the present exemplary embodiments, forward and reverse braking/warnings) in a vehicle configured with a manual transmission is described in further detail herein below. Certain exemplary parameters and flags are defined as follows:

GEAR_CURRENT is the current transmission state (e.g. R, 5, 4, 3, 2, 1, N for a manual transmission);
GEAR_PREVIOUS is the previous transmission state, i.e. the transmission state before the last transmission shift (e.g. R, 5, 4, 3, 2, 1, N for a manual transmission);
BI_DIR is TRUE if both forward and reverse braking capabilities need to be enabled; otherwise, BI_DIR is FALSE;

SPEED_0 is TRUE if vehicle speed has ever been zero during the current cycle of transmission Neutral state; otherwise, SPEED_0 is FALSE;

GEAR_INPUT is the transmission gear input to the system (e.g. It, 5, 4, 3, 2, 1, N for a manual transmission);

VEH_SPEED is the vehicle speed.

Some initial conditions are assumed as follows:

GEAR_CURRENT=N (Neutral);

GEAR_PREVIOUS=N;

BI_DIR=FALSE;

SPEED_0=FALSE.

These conditions correspond to a new vehicle ignition cycle initialization (501). A check is made at (505) to determine whether a transmission shift between gears has occurred. Transmission shifts are tracked with rolling memory as follows. When there is a transmission shift, the new GEAR_INPUT will be different from GEAR_CURRENT and block (505) will pass control to block (507). Otherwise, block (505) will bypass block (507) and execute block (509). At block (507), GEAR_PREVIOUS is then set to GEAR_CURRENT, GEAR_CURRENT is set to GEAR_INPUT and SPEED_0 is set to FALSE.

Vehicle direction of travel is determined and applications are enabled in accordance with the present invention as follows. If GEAR_INPUT is not N (Neutral) as determined at block (509), then direction of travel is determined to correspond to the current gear state and applications only in the direction consistent with GEAR_CURRENT are enabled by setting BI_DIR to FALSE (511) and enabling applications in the direction consistent with the current transmission state GEAR_CURRENT (513). If, however, GEAR_INPUT is N (Neutral), then direction of travel and application enablement determinations are made in accordance with temporal vehicle speed and transmission shift history considerations (515). If GEAR_CURRENT=N (Neutral) (509) and the absolute value of vehicle speed is less than or equal to a calibration, |VEH_SPEED|≦CAL (517), or vehicle speed has been less than or equal to the calibration during the current transmission Neutral state, SPEED_0=TRUE (519), then direction of travel is indeterminate. In such a case, both the forward and reverse applications are enabled by setting BI_DIR to TRUE (521) and enabling applications in both directions (523). CAL represents a calibrated value indicative of a substantially null or zero vehicle speed. Where absolute value of vehicle speed is less than or equal to the calibration, |VEH_SPEED|≦CAL (517), then SPEED_0 is set to TRUE (525), thus indicating that the current transmission Neutral state has experienced a substantially zero vehicle speed. These situations (i.e. current zero vehicle speed or vehicle speed having been zero during the current transmission Neutral state) correspond to bi-directional application enablement, for example, to address a stopped vehicle roll back or roll forward on grade. If, however, GEAR_CURRENT=N (Neutral) and the absolute value of vehicle speed is not and has not been less than or equal to the calibration during the current transmission Neutral state, as determined by negative responses at blocks (517) and 519), then direction of travel is determined to correspond to the immediately preceding gear state and applications only in the direction consistent with GEAR_PREVIOUS are enabled by setting BI_DIR to FALSE (527) and enabling applications in the direction consistent with the previous transmission state GEAR_PREVIOUS (529). This situation provides application enablement, for example, to address a shift to Neutral during vehicle motion. In all three cases above, the exemplary application enabled may include an operator warning that braking is prudent or a vehicle control of automatic braking.

Figure 6:
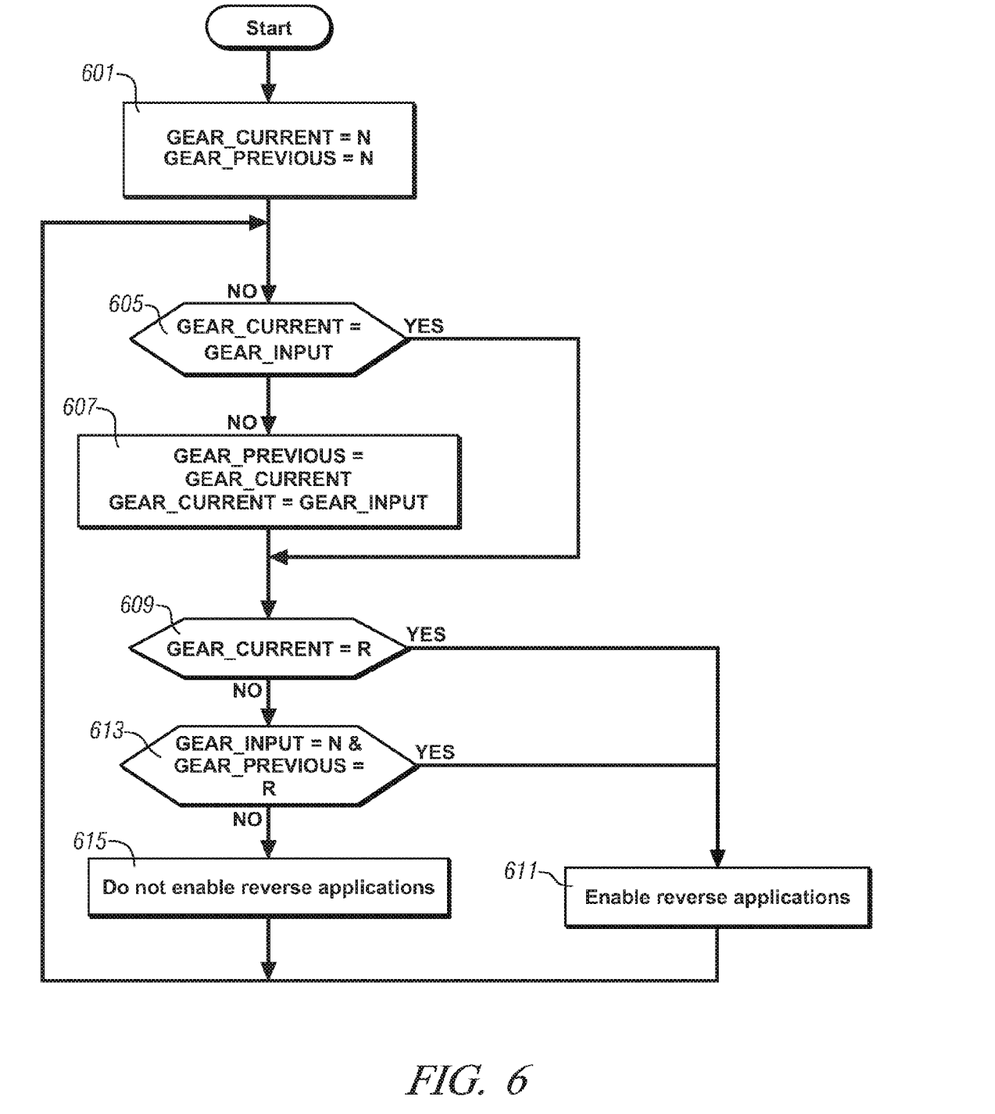
FIG. 6 is a block diagram illustrating exemplary tasks embodied in instruction sets of computer based controls for enabling only reverse directional safety and convenience applications in a vehicle configured with a manual transmission.

The block diagram of FIG. 6 illustrating exemplary tasks embodied in instruction sets of computer based controls for effecting only reverse directional applications (e.g. in the present exemplary embodiments, reverse braking/warnings) in a vehicle configured with a manual transmission is described in further detail herein below. In this case, there is no need for parameters BI_DIR, SPEED_0, and VEH_SPEED. The other parameters and initial conditions remain as defined herein above with respect to the bi-directional implementation.

Some initial conditions are assumed as follows:

GEAR_CURRENT=N (Neutral);

GEAR_PREVIOUS=P.

These conditions correspond to a new vehicle ignition cycle initialization (601). A check is made at (605) to determine whether a transmission shift between gears has occurred. Transmission shifts are tracked with rolling memory as follows. When there is a transmission shift, the new GEAR_INPUT will be different from GEAR_CURRENT and block (605) will pass control to block (607). Otherwise, block (605) will bypass block (607) and execute block (609). At block (607), GEAR_PREVIOUS is then set to GEAR_CURRENT and GEAR_CURRENT is set to GEAR_INPUT.

Vehicle direction of travel is determined and applications enabled in accordance with the present invention as follows. If the transmission state GEAR_CURRENT=R (reverse) as determined at block (609), then direction of travel is determined to be reverse and reverse applications are enabled (611). If the transmission state is anything but reverse, i.e. block (609) being answered negatively, then direction of travel and application enablement determinations are made in accordance with temporal transmission shift history considerations (613). If the transmission is in a forward gear or the transmission was shifted to Neutral from a forward gear, then direction of travel is determined to be forward. In such a case, block (613) is answered negatively and control passes to block (615) whereat reverse applications are not enabled. Otherwise, the transmission was shifted to Neutral from reverse and direction of travel is determined to be reverse. In such a case, block (613) is answered affirmatively and control passes to block (611) whereat reverse applications are enabled. In the reverse cases above, the exemplary application enabled may include an operator warning that braking is prudent or a vehicle control of automatic braking.

Figure 7:
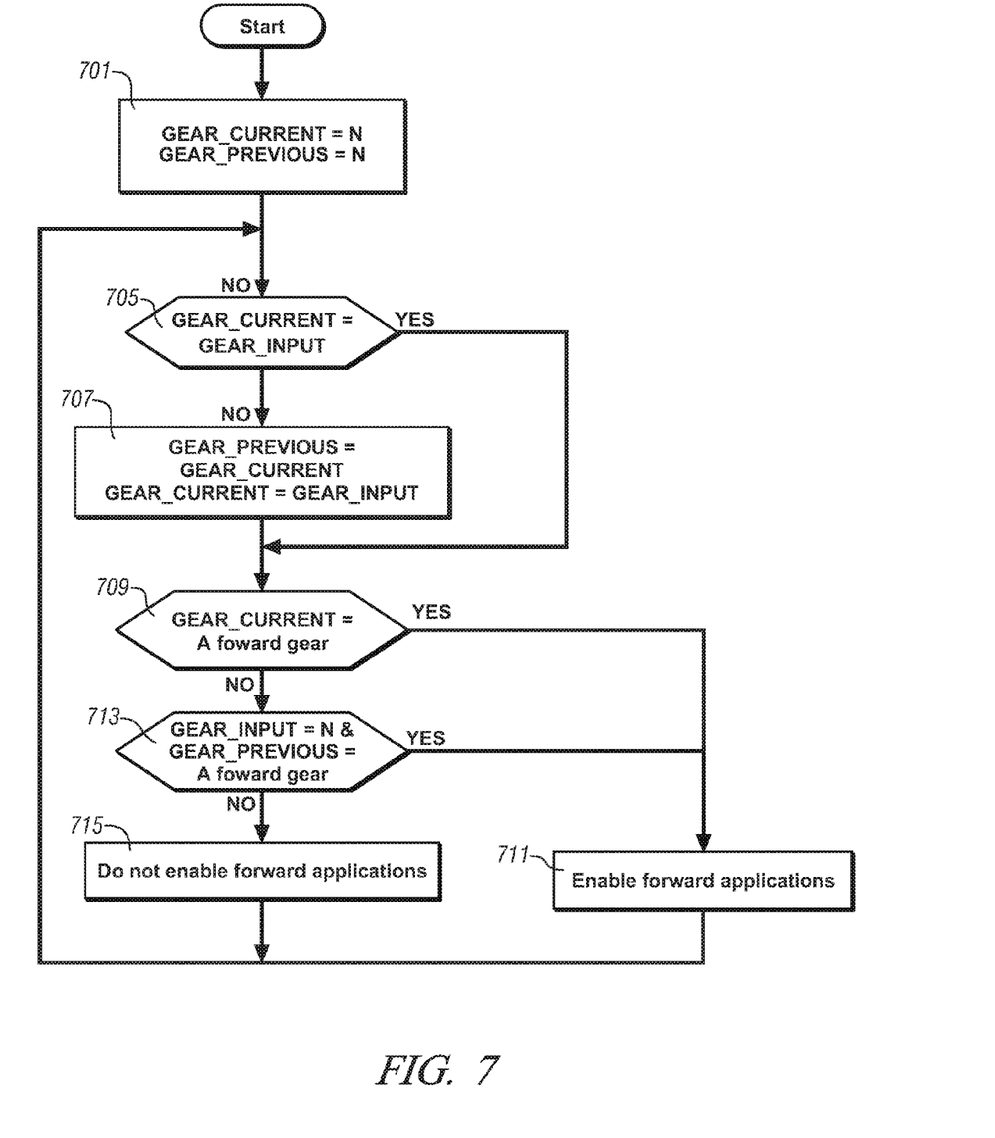
FIG. 7 is a block diagram illustrating exemplary tasks embodied in instruction sets of computer based controls for enabling only forward directional safety and convenience applications in a vehicle configured with a manual transmission.

The block diagram of FIG. 7 illustrating exemplary tasks embodied in instruction sets of computer based controls for effecting only forward directional applications (e.g. in the present exemplary embodiments, forward braking/warnings) in a vehicle configured with a manual transmission is described in further detail herein below. In this case, as in the case of only reverse directional applications, there is no need for parameters BI_DIR, SPEED_0 and VEH_SPEED. The other parameters and initial conditions remain as defined herein above with respect to the bi-directional implementation.

Some initial conditions are assumed as follows:

GEAR_CURRENT=N (Neutral);

GEAR_PREVIOUS=N.

These conditions correspond to a new vehicle ignition cycle initialization (701). So long as the vehicle transmission remains in Park, no further action is taken (703). A shift out of Park, or any time the transmission is not in Park, a check is made at (705) to determine whether a transmission shift between gears has occurred. Transmission shifts are tracked with rolling memory as follows. When there is a transmission shift, the new GEAR_INPUT will be different from GEAR_CURRENT and block (705) will pass control to block (707). Otherwise, block (705) will bypass block (707) and execute block (709). At block (707), GEAR_PREVIOUS is then set to GEAR_CURRENT and GEAR_CURRENT is set to GEAR_INPUT.

Vehicle direction of travel is determined and applications are enabled in accordance with the present invention as follows. If the transmission state GEAR_CURRENT=a forward gear as determined at block (709), then direction of travel is determined to be forward and forward applications are enabled (711). If the transmission state is anything but a forward gear, i.e. block (709) being answered negatively, then direction of travel and automatic braking determinations are made in accordance with temporal transmission shift history considerations (713). If the transmission is in reverse or the transmission was shifted to Neutral from reverse, then direction of travel is determined to be reverse. In such a case, block (713) is answered negatively and control passes to block (715) whereat forward applications are not enabled. Otherwise, the transmission was shifted to Neutral from a forward gear and direction of travel is determined to be forward. In such a case, block (713) is answered affirmatively and control passes to block (711) whereat forward applications are enabled. In the forward cases above, the exemplary application enabled may include an operator warning that braking is prudent or a vehicle control of automatic braking.

The present invention has been described with respect to certain preferred embodiments and variations herein. Other alternative embodiments, variations and implementations may be practiced without departing from the scope of the invention which is to be limited only by the claims as follow.

The invention claimed is:

1. Method for determining direction of travel of a motor vehicle including a transmission having selectable gear states, comprising:
   monitoring the transmission for a current gear state and an immediately preceding gear state;
   monitoring vehicle speed; and
   determining a direction of travel based on a selected gear input during a transmission shift when one of a) the current gear state is a forward or reverse gear state, the forward gear state indicating a forward direction of travel when the forward gear state is selected as the gear input and the reverse gear state indicating a reverse direction of travel when the reverse gear state is selected as the gear input, and b) the current gear state is a neutral gear state when the neutral gear state is selected as the gear input, the immediately preceding gear state is a forward or reverse gear state, and vehicle speed during the current gear state remains above a predetermined threshold.

2. The method for determining direction of travel of a motor vehicle as claimed in claim 1 further comprising:
   determining an indeterminate direction of travel when the current gear state is neutral and vehicle speed at any time during the current gear state is below a predetermined threshold.

3. The method for determining direction of travel of a motor vehicle as claimed in claim 1 wherein determining a direction of travel based on a selected gear input during a transmission shift comprises determining a forward direction of travel when the current gear state is a neutral gear state, the immediately preceding gear state is a forward gear state, and vehicle speed during the current gear state remains above a predetermined threshold.

4. The method for determining direction of travel of a motor vehicle as claimed in claim 1 wherein determining a direction of travel based on a selected gear input during a transmission shift comprises determining a reverse direction of travel when the current gear state is a neutral gear state, the immediately preceding gear state is a reverse gear state, and vehicle speed at all times during the current gear state is above a predetermined threshold.

5. Method for determining direction of travel of a motor vehicle including a transmission having selectable gear states, comprising:
   monitoring the transmission for a current gear state and an immediately preceding gear state;
   monitoring vehicle speed;
   determining a forward direction of travel based on a selected gear input during a transmission shift when one of a) the current gear state is a forward gear state when the forward gear state is selected as the gear input and b) the current gear state is a neutral gear state when the neutral gear state is selected as the gear input, the immediately preceding gear state is a forward gear state, and vehicle speed during the current gear state remains above a predetermined threshold; and
   determining a reverse direction of travel based on a selected gear input during a transmission shift when one of a) the current gear state is a reverse gear state when the reverse gear state is selected as the gear input and b) the current gear state is a neutral gear state when the neutral gear state is selected as the gear input, the immediately preceding gear state is a reverse gear state, and vehicle speed at all times during the current gear state is above a predetermined threshold.

6. The method for determining direction of travel of a motor vehicle as claimed in claim 5 further comprising:
   determining an indeterminate direction of travel when the current gear state is neutral and vehicle speed at any time during the current gear state is below a predetermined threshold.

7. The method for determining direction of travel of a motor vehicle as claimed in claim 6 further comprising:
   if indeterminate direction of travel is determined when the current gear state is neutral and vehicle speed at any time during the current gear state is below a predetermined threshold, enabling vehicle safety and convenience systems that correspond to forward and reverse directions of travel.

8. The method for determining direction of travel of a motor vehicle as claimed in claim 5 further comprising:
   if reverse direction of travel is determined when the current gear state is a neutral gear state when the neutral gear state is selected as the gear input, the immediately preceding gear state is a reverse gear state, and vehicle speed at all times during the current gear state is above a predetermined threshold, enabling vehicle safety and convenience systems that correspond to reverse direction of travel.

9. The method for determining direction of travel of a motor vehicle as claimed in claim 5 further comprising:
   if forward direction of travel is determined when the current gear state is a neutral gear state when the neutral gear state is selected as the gear input, the immediately preceding gear state is a forward gear state, and vehicle speed at all times during the current gear state is above a predetermined threshold, enabling vehicle safety and convenience systems that correspond to forward direction of travel.

* * * * *